(12) United States Patent
Muramatsu

(10) Patent No.: US 11,339,870 B2
(45) Date of Patent: May 24, 2022

(54) PLANETARY CARRIER

(71) Applicant: HONDA MOTOR CO., LTD., Tokyo (JP)

(72) Inventor: Isamu Muramatsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/925,347

(22) Filed: Jul. 10, 2020

(65) Prior Publication Data

US 2021/0018090 A1 Jan. 21, 2021

(30) Foreign Application Priority Data

Jul. 19, 2019 (JP) .............................. JP2019-133555

(51) Int. Cl.
*F16H 57/08* (2006.01)
(52) U.S. Cl.
CPC .................................. *F16H 57/082* (2013.01)
(58) Field of Classification Search
CPC .................................................... F16H 57/082
See application file for complete search history.

(56) References Cited

U.S. PATENT DOCUMENTS

| | | | | |
|---|---|---|---|---|
| 3,527,121 A * | 9/1970 | Moore | .................. | F16H 57/082 475/338 |
| 6,422,971 B1 * | 7/2002 | Katou | ...................... | F16H 1/28 475/331 |
| 8,419,588 B2 * | 4/2013 | Palfai | ..................... | H02K 7/116 475/331 |
| 2005/0026744 A1 * | 2/2005 | Lllerhaus | .............. | F16H 57/082 475/331 |
| 2008/0188338 A1 * | 8/2008 | Kimes | ................... | F16H 57/082 475/148 |
| 2010/0105515 A1 * | 4/2010 | Goleski | ................. | F16H 57/082 475/341 |
| 2013/0324352 A1 * | 12/2013 | Nomura | ................ | F16H 57/082 475/331 |
| 2018/0003288 A1 * | 1/2018 | Rippelmeyer | .......... | B23B 51/08 |

FOREIGN PATENT DOCUMENTS

| | | |
|---|---|---|
| JP | 11-159602 | 6/1999 |
| JP | 6027840 | 11/2016 |

OTHER PUBLICATIONS

Japanese Notice of Allowance for Japanese Patent Application No. 2019-133555 dated Apr. 13, 2021.

* cited by examiner

*Primary Examiner* — David J Hlavka
(74) *Attorney, Agent, or Firm* — Amin, Turocy & Watson, LLP

(57) ABSTRACT

A planetary carrier includes first and second support hole parts that support a pinion shaft on which a pinion gear is provided from both sides in an axial direction. The planetary carrier includes a first holding member and a second holding member. The first holding member includes a connection end that extends in an axial direction toward a second holding member and that is connected to and faces the second holding member. The second holding member includes a fragile part formed on an end part in a circumferential direction in a region to which the connection end is connected.

4 Claims, 4 Drawing Sheets

PLANETARY CARRIER

CROSS-REFERENCE TO RELATED APPLICATION

Priority is claimed on Japanese Patent Application No. 2019-133555, filed on Jul. 19, 2019, the contents of which are incorporated herein by reference.

BACKGROUND

Field of the Invention

The present invention relates to a planetary carrier.

Background

For example, a planetary gear mechanism is used for an automotive transmission or the like, and as the planetary gear mechanism, such a mechanism is known in which a planetary carrier is formed of a carrier base and a carrier plate. Leg parts (bridges) are provided on the carrier plate at intervals in a circumferential direction. A connection end of a leg part is inserted into an attachment hole of the carrier base, and the connection end inserted into the attachment hole is welded to the carrier base from an opposite side of the carrier plate. Thereby, the carrier plate is joined to the carrier base, and the planetary carrier is assembled. In a circumference of the planetary carrier, an accommodation opening is formed between the leg parts, and a pinion gear is arranged in the accommodation opening. The pinion gear is rotatably supported by the carrier base and the carrier plate via a pinion shaft.

In the planetary carrier, the connection end of the leg part is inserted into the attachment hole of the carrier base, and the connection end inserted into the attachment hole is welded to the carrier base. In a state where the connection end is joined to the carrier base by welding, a space is formed between the leg part and the attachment hole in the circumferential direction. By releasing a strain of the pinion gear and the carrier base using the space, it becomes possible to adjust a stiffness of the planetary carrier in accordance with a stiffness of the pinion gear. Accordingly, for example, by the engagement of the pinion gear and the sun gear, it is possible to prevent a pitching from occurring in a tooth surface of the pinion gear (for example, refer to Japanese Patent No. 6027840).

SUMMARY

In the planetary carrier of Japanese Patent No. 6027840, a connection end of a leg part is inserted into an attachment hole of a carrier base, and by welding the inserted connection end to the carrier base from an opposite side of a carrier plate, the carrier plate is assembled to the carrier base. For example, in order to reduce the cost of the planetary carrier, it is conceivable to change a configuration in which the connection end of the leg part is inserted into the attachment hole of the carrier base of Japanese Patent No. 6027840, or a welding method of the connection end.

However, in a case where the configuration of the planetary carrier or the welding method is changed, it becomes difficult to match the stiffness of the carrier plate to the stiffness of the pinion gear, and there is a possibility that a pitching occurs in the tooth surface of the pinion gear.

As a countermeasure, for example, it is conceivable that a new pinion gear is prepared in accordance with the stiffness of the planetary carrier. However, preparing a new pinion gear prevents the cost from being reduced. Further, in a case where a new pinion gear is prepared, a variety of pinion gears each having a different stiffness are present, and there is a possibility that an assembly error of the pinion gear to the planetary carrier occurs.

An aspect of the present invention is intended to provide a planetary carrier capable of reducing a cost of the planetary carrier and capable of adjusting a stiffness of the planetary carrier in accordance with a stiffness of a pinion gear.

A planetary carrier according to a first aspect of the present invention is a planetary carrier that rotatably supports a plurality of pinion gears engaged to a sun gear and a ring gear, the planetary carrier including a pair of holding members having a support hole part that supports a pinion shaft on which a pinion gear is provided from both sides in an axial direction, wherein a first holding member which is one of the pair of holding members includes a connection part that extends in the axial direction toward a second holding member which is another of the pair of holding members, the connection part having a connection end that is connected to and faces the second holding member, and the second holding member includes a fragile part formed on an end part in a circumferential direction in a region to which the connection end is connected.

According to the first aspect described above, by connecting the connection end of the first holding member (that is, the connection part) to the second holding member to face the second holding member, it is possible to weld the connection end to the second holding member from the connection end side. Accordingly, it is not necessary to insert the connection end of the first holding member into the attachment hole of the second holding member and weld the connection end to the second holding member from the opposite side of the connection end as in the planetary carrier of the related art. Thereby, it is possible to change shapes of the first holding member and the second holding member into a simple shape. In this way, by changing the first holding member and the second holding member into a simple configuration and further changing the welding method of the connection end, it is possible to reduce the cost of the planetary carrier.

Further, by connecting the connection end of the first holding member to the second holding member to face the second holding member, it is possible to shorten the connection part. Thereby, it is possible to reduce the weight of the planetary carrier (specifically, the first holding member).

Further, in the second holding member, the fragile part is formed on the end part in the circumferential direction of the region to which the connection end is connected. By releasing a strain of the other second holding member (that is, the carrier base and the pinion gear) using the fragile part, it is possible to adjust the stiffness of the planetary carrier in accordance with the stiffness of the pinion gear. Thereby, for example, it is possible to prevent a case in which the pinion gear is engaged with the sun gear while having an inclination by the stiffness of the carrier base being changed, and a pitching occurs in the tooth surface of the pinion gear.

Further, by adjusting the stiffness of the planetary carrier in accordance with the stiffness of the pinion gear, for example, it is not necessary to prepare a new pinion gear in accordance with the stiffness of the planetary carrier, and it is possible to reduce the cost and prevent an assembly error of the pinion gear.

Further, by providing the fragile part, the stiffness of the planetary carrier is adjusted in accordance with the stiffness of the pinion gear, and thereby, for example, the specification of the planetary carrier can be easily changed.

A second aspect of the present invention is the planetary carrier according to the first aspect described above, wherein the fragile part may be formed at both end parts in a circumferential direction in the region to which the connection end is connected.

According to the second aspect described above, the fragile part is formed at both end parts in the circumferential direction of the region to which the connection end is connected in the second holding member. By forming the fragile part at both end parts in the circumferential direction, the strain of the other second holding member (that is, the carrier base) can be adjusted from both sides in a well-balanced manner, and it is possible to enhance the degree of freedom of the adjustment.

Further, by forming the fragile part at both end parts in the circumferential direction, the strain of the other second holding member can be favorably adjusted in both forward and reverse rotations of the planetary carrier, and it is possible to further enhance the degree of freedom of the adjustment.

A third aspect of the present invention is the planetary carrier according to the first or second aspect described above, wherein the fragile part may be formed in a region that avoids a welding margin of the connection end.

According to the third aspect described above, by forming the fragile part in the region that avoids the welding margin of the connection end, it is possible to ensure the strength of welding that joins the connection end of the connection part to the second holding member, and it is possible to reduce the welding cost.

A fourth aspect of the present invention is the planetary carrier according to any of the first to third aspects described above, wherein the fragile part may be formed in a region that avoids a pinion washer fitted to the pinion shaft and interposed between the second holding member and the pinion gear in a state where the pinion gear is attached to the planetary carrier.

According to the fourth aspect described above, by forming the fragile part in the region that avoids the pinion washer, for example, it is possible to prevent the fragile part from interfering with the pinion washer. Thereby, for example, it is possible to avoid an unexpected wear or the like from occurring in the pinion washer or the like due to the rotation of the pinion washer.

A fifth aspect of the present invention is the planetary carrier according to any of the first to fourth aspects described above, wherein the fragile part may be a hole part that penetrates through the second holding member in the axial direction.

According to the fifth aspect described above, the fragile part is the hole part, and thereby, it is possible to easily form the fragile part and reduce the cost of the planetary carrier.

According to the planetary carrier of the aspect of the present invention, it is possible to reduce the cost of the planetary carrier, and it is possible to adjust the stiffness of the planetary carrier in accordance with the stiffness of the pinion gear.

DESCRIPTION OF EMBODIMENTS

Hereinafter, an embodiment of the present invention will be described with reference to the drawings. The embodiment is described using an example in which a planetary carrier 4 is applied to a single pinion type planetary gear mechanism 1; however, the planetary carrier 4 may be applied, for example, to a double pinion type planetary gear mechanism or the like. The embodiment is described using an example in which the planetary gear mechanism 1 is applied to a driving device of a vehicle; however, the planetary gear mechanism 1 may be applied to another device.

[Planetary Gear Mechanism]

Figure 1:
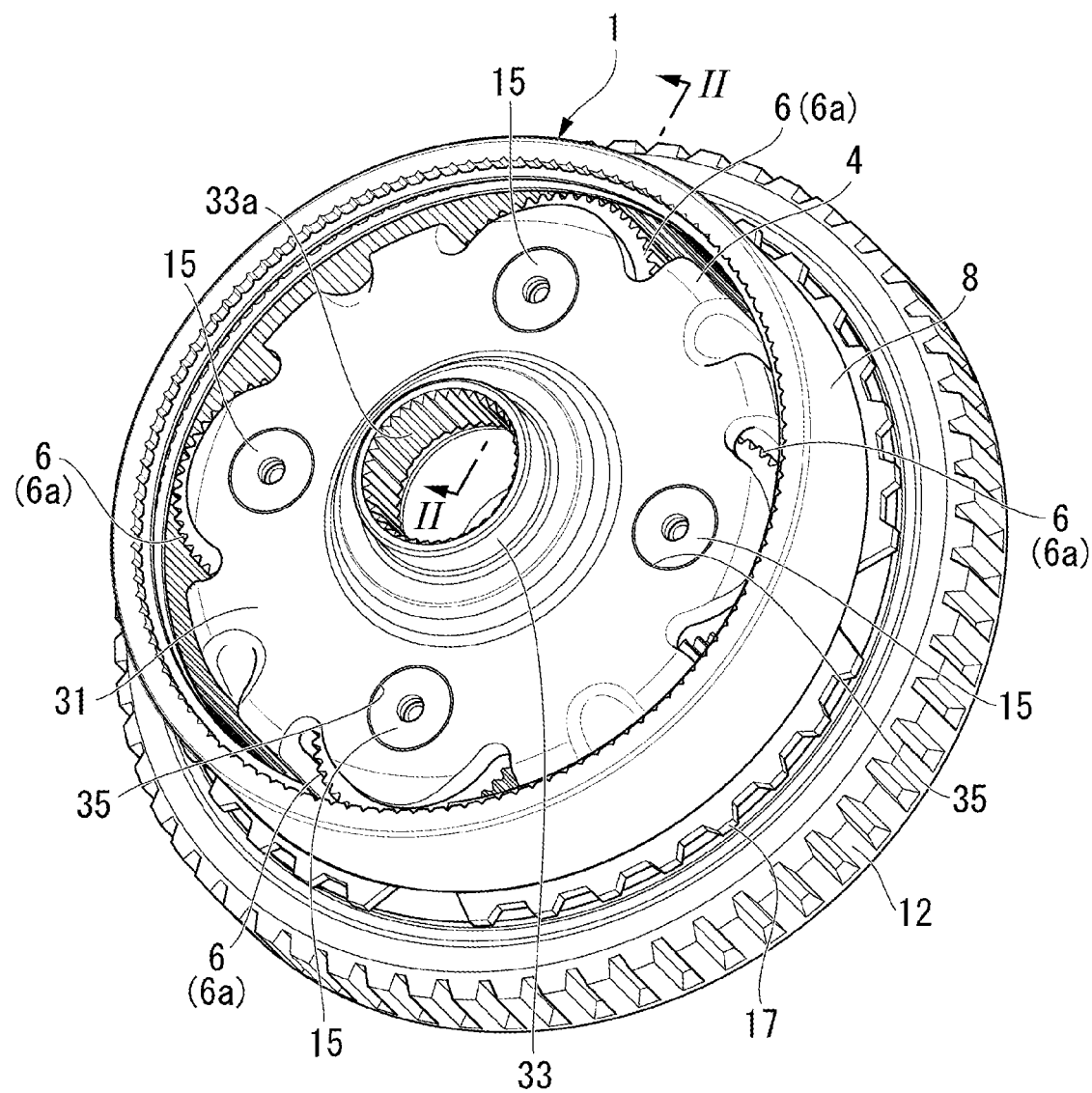
FIG. 1 is a perspective view of a planetary gear mechanism according to an embodiment of the present invention.
Figure 2:
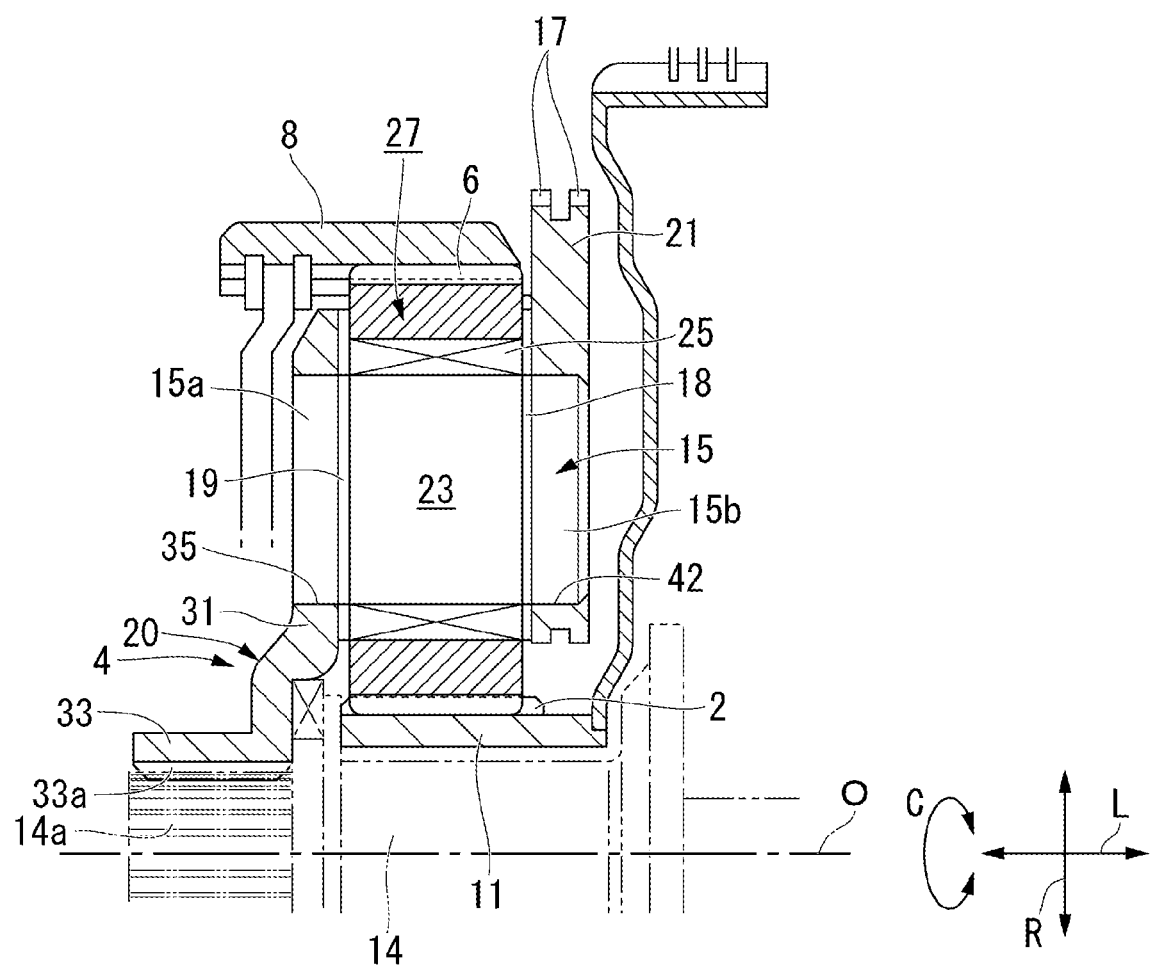
FIG. 2 is a cross-sectional view along a II-II line of FIG. 1.

FIG. 1 is a perspective view of the planetary gear mechanism 1. FIG. 2 is a cross-sectional view along a II-II line of FIG. 1.

As shown in FIG. 1 and FIG. 2, the planetary gear mechanism 1 is provided, for example, in a driving device of a vehicle. The planetary gear mechanism 1 includes a sun gear 2, the planetary carrier 4, a plurality of pinion gears (planetary gears) 6, and a ring gear 8.

The sun gear 2 is connected to a first rotation shaft 11. The planetary carrier 4 is connected to a second rotation shaft 14. The plurality of pinion gears 6 are rotatably supported via a pinion shaft 15 by the planetary carrier 4. A portion of the pinion gear 6 is exposed to the outside from the planetary carrier 4. A region 6a exposed from the planetary carrier 4 of the pinion gear 6 is engaged to the ring gear (that is, an inner circumferential tooth) 8. An outer circumferential gear 17 is formed on an outer circumference of the planetary carrier 4.

Hereinafter, a shaft center O direction of the planetary carrier 4 is referred to as an "axial direction L", a circumferential direction of the shaft center O of the planetary carrier 4 is referred to as a "circumferential direction C", and a radial direction having the shaft center O of the planetary carrier 4 as a center is referred to as a "radial direction R".

A first pinion washer 18 is fitted between the pinion gear 6 and the carrier base 21 described later. A second pinion washer 19 is fitted between the pinion gear 6 and the carrier plate 20 (specifically, a main body part 31) described later. The first pinion washer 18 and the second pinion washer 19 rotate in accordance with the rotation of the pinion gear 6.

<Planetary Carrier>

Figure 3:
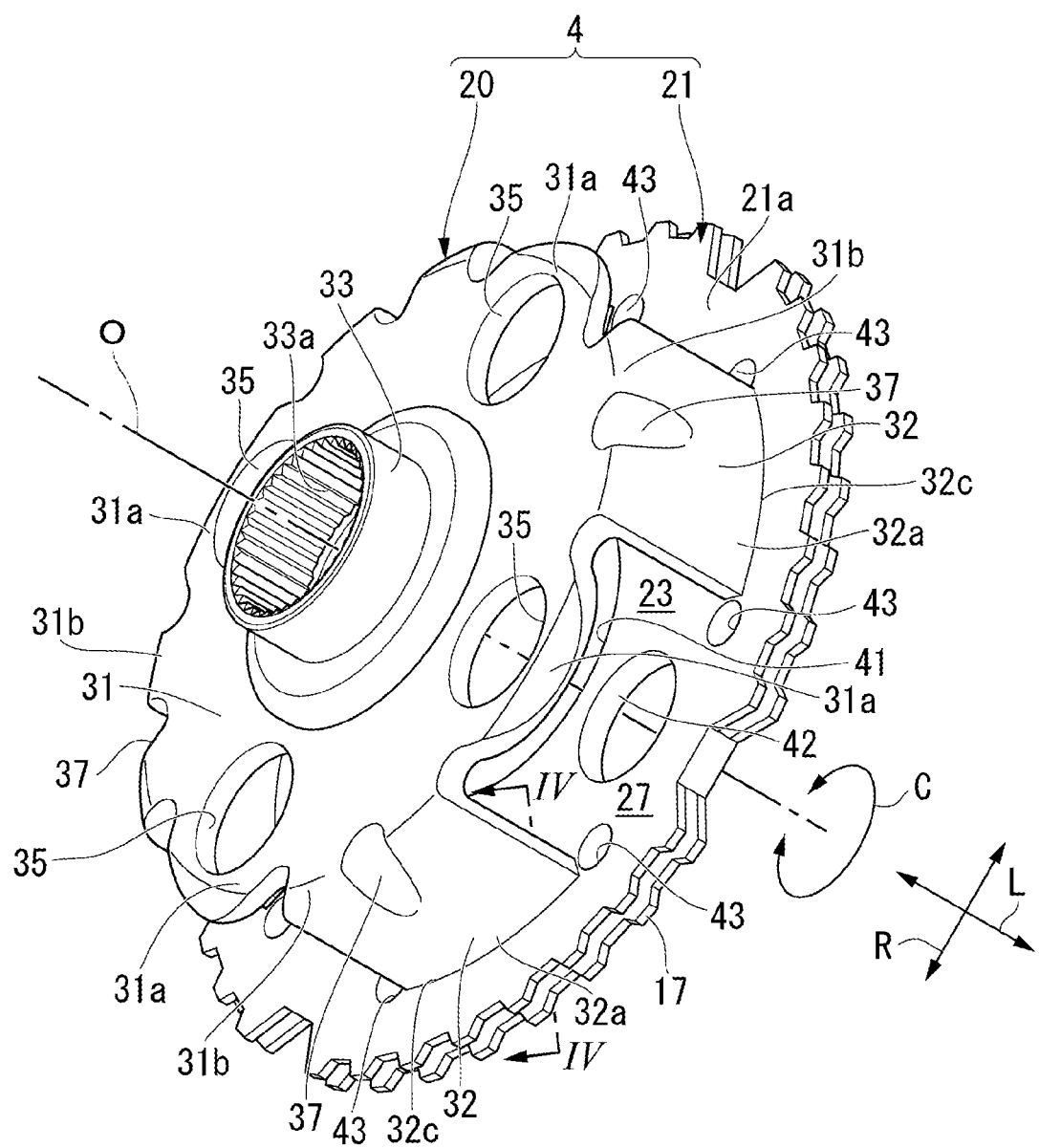
FIG. 3 is a perspective view of a planetary carrier of the embodiment.

FIG. 3 is a perspective view of the planetary carrier 4.
As shown in FIG. 1 to FIG. 3, the planetary carrier 4 includes a carrier plate (first holding member) 20 which is one of a pair of holding members 20 and 21 and a carrier base (second holding member) 21 which is another of the pair of holding members 20 and 21. In an internal space 23 of the planetary carrier 4, a plurality of pinion shafts 15 are arranged at intervals in a circumferential direction C and are supported by the planetary carrier 4 toward the axial direction L. The pinion gear 6 is rotatably supported by the bearing 25 on the pinion shaft 15. The pinion gear 6 is rotatably supported via the pinion shaft 15 in an accommodation opening 27 between the leg part (connection part, bridge) 32 and the leg part 32 in the circumferential direction of the planetary carrier 4.

The carrier plate 20 includes the main body part 31, a plurality of leg parts (connection parts, bridges) 32, and a carrier shaft 33.

The main body part 31 is arranged orthogonal to the axial direction L and is formed in a substantially rectangular shape. A first support hole part (support hole part) 35 that penetrates in the axial direction L is formed substantially on a top portion 31 of the rectangular shape of the main body part 31. One end part 15a of the pinion shaft 15 is supported by the first support hole part 35 in a state of being inserted in the first support hole part 35. A carrier shaft 33 protrudes from a middle of the main body part 31 in the axial direction L. The carrier shaft 33 is formed in a cylindrical shape. A spline 33a is formed on an inner circumference of the carrier shaft 33. A spline 14a of the second rotation shaft 14 is connected to the spline 33a.

The leg part 32 is integrally formed in a region 31b (hereinafter, referred to as a bend region 31b) of the main body part 31 between adjacent first support hole parts 35. The plurality of leg parts 32 are arranged at an equal interval in the circumferential direction C at the same position with respect to the radial direction R. The leg part 32 extends along the axial direction L, for example, from the bend region 31b toward the carrier base 21.

A recess portion 37 is provided in the bend region 31b. By providing the recess portion 37 in the bend region 31b, the leg part 32 is reinforced by the recess portion 37. The leg part 32 is formed in an arc shape along the circumferential direction C. A connection end 32a is provided on a front end of the leg part 32 facing the carrier base 21.

Figure 4:
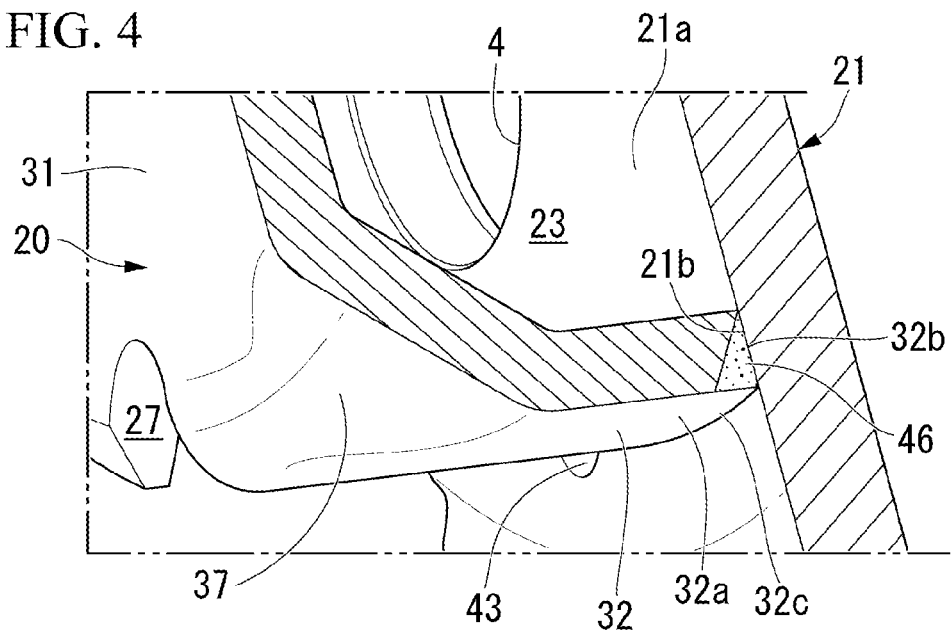
FIG. 4 is a cross-sectional view along a IV-IV line of FIG. 3.

FIG. 4 is a cross-sectional view along a IV-IV line of FIG. 3.

As shown in FIG. 3 and FIG. 4, the connection end 32a is connected in a state where a front end surface 32b faces a surface (hereinafter, referred to as a base surface) 21a of the carrier base 21 facing the carrier plate 20. The connection between the base surface 21a and the front end surface 32b of the connection end 32a will be described later in detail.

Figure 5:
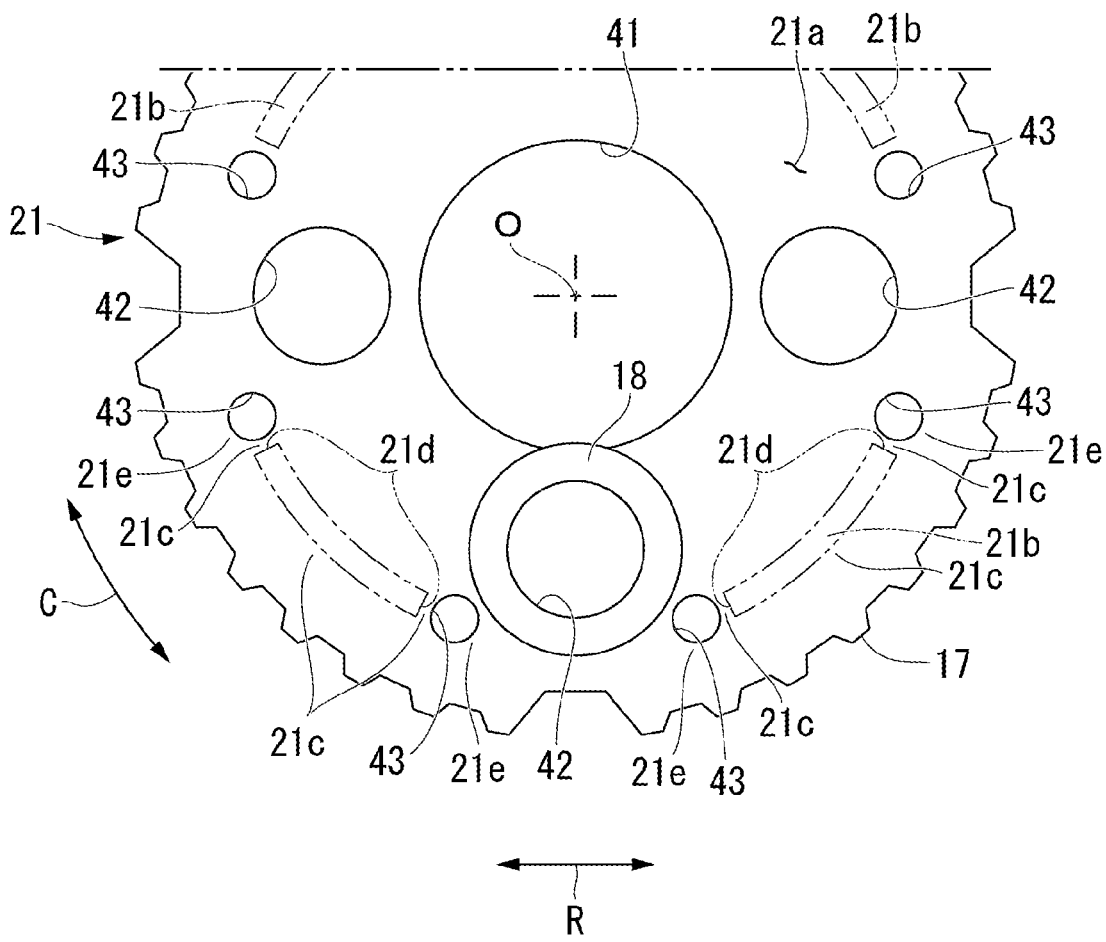
FIG. 5 is a plan view showing a carrier base of the planetary carrier of the embodiment.

FIG. 5 is a plan view showing the carrier base 21 of the planetary carrier 4.

As shown in FIG. 2 and FIG. 5, the carrier base 21 is formed in a substantially disk shape. An opening part 41 opens in the middle of the carrier base 21 so as to penetrate in the axial direction L. The carrier base 21 includes a second support hole part (support hole part) 42, a base connection surface 21b, a fragile part 43, and an outer circumferential gear 17.

The second support hole part 42 is formed at a position that overlaps the first support hole part 35 of the carrier plate 20 in the axial direction L. The second support hole part 42, as well as the first support hole part 35, penetrates in the axial direction L. Another end part 15b of the pinion shaft 15 is supported by the second support hole part 42 in a state of being inserted through the second support hole part 42. An outer circumferential gear 17 is integrally formed on an outer circumference of the carrier base 21. A gear of an oil pump is engaged with the outer circumferential gear 17.

The base connection surface 21b of the base surface 21a is described. In FIG. 5, the base connection surface 21b is illustrated using an imaginary line in order to facilitate understanding of the base connection surface 21b.

As shown in FIG. 5, a plurality of base connection surfaces 21b are formed in the base surface 21a in a planar manner similarly to the base surface 21a. The plurality of base connection surfaces 21b are formed in a curved shape along the circumferential direction C between adjacent second support hole parts 42 at the same position with respect to the radial direction R.

Specifically, the base connection surface 21b is formed such that a length in the circumferential direction C of the base connection surface 21b is substantially the same as a length in the circumferential direction C of the front end surface 32b of the connection end 32a (refer to FIG. 3). The base connection surface 21b is formed such that a width in the radial direction R of the base connection surface 21b is substantially the same as a width in the radial direction R of the front end surface 32b. That is, the base connection surface 21b is formed in the same shape as that of the front end surface 32b of the connection end 32a.

A hole in which the connection end 32a is inserted is not formed in the base connection surface 21b.

As shown in FIG. 3 to FIG. 5, the front end surface 32b of the leg part 32 (specifically, the connection end 32a) is in contact with the base connection surface 21b in a state of facing the base connection surface 21b, and the connection end 32a is connected to the base connection surface 21b by welding. Specifically, for example, in a state where the front end surface 32b faces and is in contact with the base connection surface 21b, by welding from the base surface 21a side along an outer circumference 32c of the connection end 32a, the connection end 32a is joined to the base connection surface 21b by a connection part 46. That is, the base connection surface 21b is a region of the base surface 21 which is formed in the same planar surface as the base surface 21a and to which the connection end 32a is connected in a state of facing the front end surface 32b.

With respect to the joint between the connection end 32a and the base connection surface 21b, the connection end 32a may be joined to the base connection surface 21b by welding from the base surface 21a side along the entire circumference (that is, the outer circumference 32c, inner circumference, and both ends) of the connection end 32a.

In the base surface 21a, a welding margin 21c is ensured around the base connection surface 21b. Thereby, the connection end 32a is favorably connected to the base connection surface 21b by welding. In this way, the connection end 32a of the leg part 32 is connected to the base connection surface 21b in a state of being butted to the base connection surface 21b. Thereby, the connection end 32a can be welded to the base connection surface 21b from a side of the carrier plate 20.

Accordingly, it is not necessary to form an attachment hole on the carrier base 21 and insert the connection end 32a to the attachment hole as in the planetary carrier of the related art. Additionally, it is not necessary to weld the connection end 32a inserted in the attachment hole to the carrier base 21 from an opposite side of the carrier plate 20.

Thereby, it is possible to form the carrier plate 20 and the carrier base 21 in a simple shape. In this way, by forming the carrier plate 20 and the carrier base 21 in a simple shape and changing the welding method of the connection end 32a, it is possible to reduce the cost of the planetary carrier 4.

Further, by connecting the front end surface 32b of the leg part 32 (that is, the connection end 32a) to the base connection surface 21b of the carrier base 21 to face the base connection surface 21b, it is possible to form the leg part 32 to be shortened. Thereby, it is possible to reduce the weight of the planetary carrier 4 (specifically, the carrier plate 20).

Further, the carrier base 21 includes the fragile part 43. The fragile part 43 is formed adjacent to both end parts 21d in the circumferential direction of the region (that is, the base connection surface 21b) of the carrier base 21 to which the connection end 32a is connected. By forming the fragile part 43 adjacent to both end parts 21d in the circumferential direction, it is possible to release the strain of the pinion gear 6 and the carrier base 21 by the fragile part 43.

That is, by providing the fragile part 43, it is possible to adjust the stiffness of the planetary carrier 4 in accordance with the stiffness of the pinion gear 6 (refer to FIG. 2). Accordingly, for example, it is possible to deform the planetary carrier 4 such that the pinion gear 6 is suitably engaged with the sun gear 2 (refer to FIG. 2). Thereby, it is possible to prevent a pitching from occurring in the tooth surface of the pinion gear 6.

Additionally, by adjusting the stiffness of the planetary carrier 4 in accordance with the stiffness of the pinion gear 6, for example, it is not necessary to prepare a new pinion gear in accordance with the stiffness of the planetary carrier 4, and it is possible to reduce the cost and prevent an assembly error of the pinion gear 6.

Further, by adjusting the stiffness of the planetary carrier 4 in accordance with the stiffness of the pinion gear 6, for example, the specification of the planetary carrier 4 can be easily changed.

Further, by forming the fragile part 43 adjacent to both end parts 21d in the circumferential direction of the base connection surface 21b, it is possible to adjust the strain of the carrier base 21 from both sides in a well-balanced manner. Thereby, it is possible to enhance the degree of freedom when adjusting the stiffness of the planetary carrier 4 in accordance with the stiffness of the pinion gear 6.

Further, by forming the fragile part 43 at both end parts 21d in the circumferential direction, it is possible to favorably adjust the strain of the carrier base 21 in both forward and reverse rotations of the planetary carrier 4. Thereby, it is possible to further enhance the degree of freedom when adjusting the stiffness of the planetary carrier 4 in accordance with the stiffness of the pinion gear 6.

The embodiment is described using an example in which the fragile part 43 is formed adjacent to both end parts 21d of the base connection surface 21b; however, as another example, the fragile part 43 may be formed adjacent to only one end part 21d of the base connection surface 21b.

The fragile part 43 is formed of, for example, a hole part having a circular (round) shape that penetrates through the carrier base 21 in the axial direction L. The fragile part 43 is the hole part, and thereby, it is possible to easily form the fragile part 43 (that is, the hole part) to be adjacent to both end parts 21d in the circumferential direction of the base connection surface 21b. The hole parts at both end parts 21d in the circumferential direction are formed, for example, in the same hole diameter. The fragile part 43 is the hole part, and thereby, it is possible to reduce the cost of the planetary carrier 4. Further, by changing the hole diameter of the hole part, it is possible to easily adjust the fragility of the fragile part 43.

The embodiment is described using an example in which the fragile part 43 is the hole part having a circular shape; however, as another example, the fragile part 43 may be a hole part having a rectangular shape or the like, a recess part formed to be recessed from the base surface 21a, or the like. Further, the embodiment is described using an example in which the hole parts at both end parts 21d in the circumferential direction are formed to have the same hole diameter; however, the diameter of a hole part on a rotation direction side on which a further large force acts among the hole parts at both end parts 21d may be made large.

Further, the fragile part 43 is formed in a region 21e that avoids the welding margin 21c of the connection end 32a and that avoids the first pinion washer (pinion washer) 18 described below in the axial direction L. Further, a region that avoids the welding margin 21c of the connection end 32a is also described as the region 21e. In other words, at least one of the region that avoids the welding margin 21c of the connection end 32a and the region that avoids the first pinion washer 18 corresponds to the region 21e.

By forming the fragile part 43 in the region 21e that avoids the welding margin 21c of the connection end 32a, it is possible to ensure the strength of welding that joins the connection end 32a of the leg part 32 to the base connection surface 21b of the carrier base 21, and it is possible to reduce the welding cost.

The reason for forming the fragile part 43 in the region 21e that avoids the first pinion washer 18 will be described later.

As shown in FIG. 2 and FIG. 3, by the connection end 32a of the leg part 32 being connected to the base connection surface 21b (refer to FIG. 4), the carrier plate 20 is integrally fixed to the carrier base 21, and the planetary carrier 4 is assembled. The internal space 23 is formed between the carrier base 21 and the carrier plate 20 in the planetary carrier 4. The pinion shaft 15 and the pinion gear 6 are arranged in the internal space 23.

That is, both end parts 15a and 15b of the pinion shaft 15 are supported by the first support hole part 35 of the carrier plate 20 and the second support hole part 42 of the carrier base 21 in a state of being fitted into the first support hole part 35 and the second support hole part 42 from both sides in the axial direction L. The pinion gear 6 is rotatably provided on the pinion shaft 15 via the bearing 25.

Part of the pinion gear 6 is exposed to the outside from the accommodation opening 27. The region 6a of the pinion gear 6 exposed from the accommodation opening 27 is engaged to the ring gear (that is, the inner circumferential tooth) 8.

Next, the reason for forming the fragile part 43 in the region 21e that avoids the first pinion washer 18 is described.

That is, in a state where the pinion gear 6 is attached to the planetary carrier 4 via the pinion shaft 15, the first pinion washer 18 is fitted to the pinion shaft 15 between the carrier base 21 and the pinion gear 6. The first pinion washer 18 is interposed between the carrier base 21 and the pinion gear 6 in a state of being sandwiched by the carrier base 21 and the pinion gear 6.

Further, the second pinion washer 19 is fitted to the pinion shaft 15 between the carrier plate 20 (specifically, the main body part 31) and the pinion gear 6. The second pinion washer 19 is interposed between the carrier plate 20 and the pinion gear 6 in a state of being sandwiched by the carrier plate 20 and the pinion gear 6.

The first pinion washer 18 and the second pinion washer 19 rotate in accordance with the rotation of the pinion gear 6.

Therefore, the fragile part 43 is formed in the region 21e (refer to FIG. 5) that avoids the first pinion washer 18 interposed between the carrier base 21 and the pinion gear 6. Accordingly, for example, it is possible to prevent the fragile part 43 from interfering with the first pinion washer 18. Thereby, for example, it is possible to avoid an unexpected wear or the like from occurring in the first pinion washer 18 due to the rotation of the first pinion washer 18.

Other Modification Examples

Although the embodiment of the present invention has been described above, the present invention is not limited to the embodiment described above. Addition, omission, substitution, and modification of the configuration can be made without departing from the scope of the invention. The present invention is not limited by the above description but is limited only by the appended claims.

The configuration element in the embodiment described above can be replaced by a known configuration element without departing from the scope of the invention, and modification examples described above may be suitably combined.

What is claimed is:

1. A planetary carrier that rotatably supports a plurality of pinion gears engaged to a sun gear and a ring gear, the planetary carrier comprising
 a pair of holding members having a support hole part that supports a pinion shaft on which a pinion gear of the plurality of pinion gears is provided from both sides in an axial direction,
 wherein a first holding member which is one of the pair of holding members comprises a plurality of connection part that extend in the axial direction toward a second holding member which is another of the pair of holding members, the plurality of connection parts having respective connection ends that are connected to and face a connection region of the second holding member, and
 the second holding member comprises a plurality of fragile parts adjacent to respective connection parts of the plurality of connection parts, wherein a pair of fragile parts of the plurality of fragile parts are formed between a first connection part of the plurality of connection parts and a second connection part of the plurality of connection parts in a circumferential direction of the connection region to which the connection ends are connected.

2. The planetary carrier according to claim 1,
 wherein the plurality of fragile parts are formed in a region that avoids a welding margin of the connection ends.

3. The planetary carrier according to claim 1,
 wherein the plurality of fragile parts are formed in a region that avoids a pinion washer fitted to the pinion shaft and interposed between the second holding member and the pinion gear in a state where the pinion gear is attached to the planetary carrier.

4. The planetary carrier according to claim 1,
 wherein the plurality of fragile parts are hole parts that penetrate through the second holding member in the axial direction.

\* \* \* \* \*